July 22, 1952  C. GENJACK  2,604,404
BABY SAFETY AND TEETHING BISCUIT
Filed Sept. 1, 1949
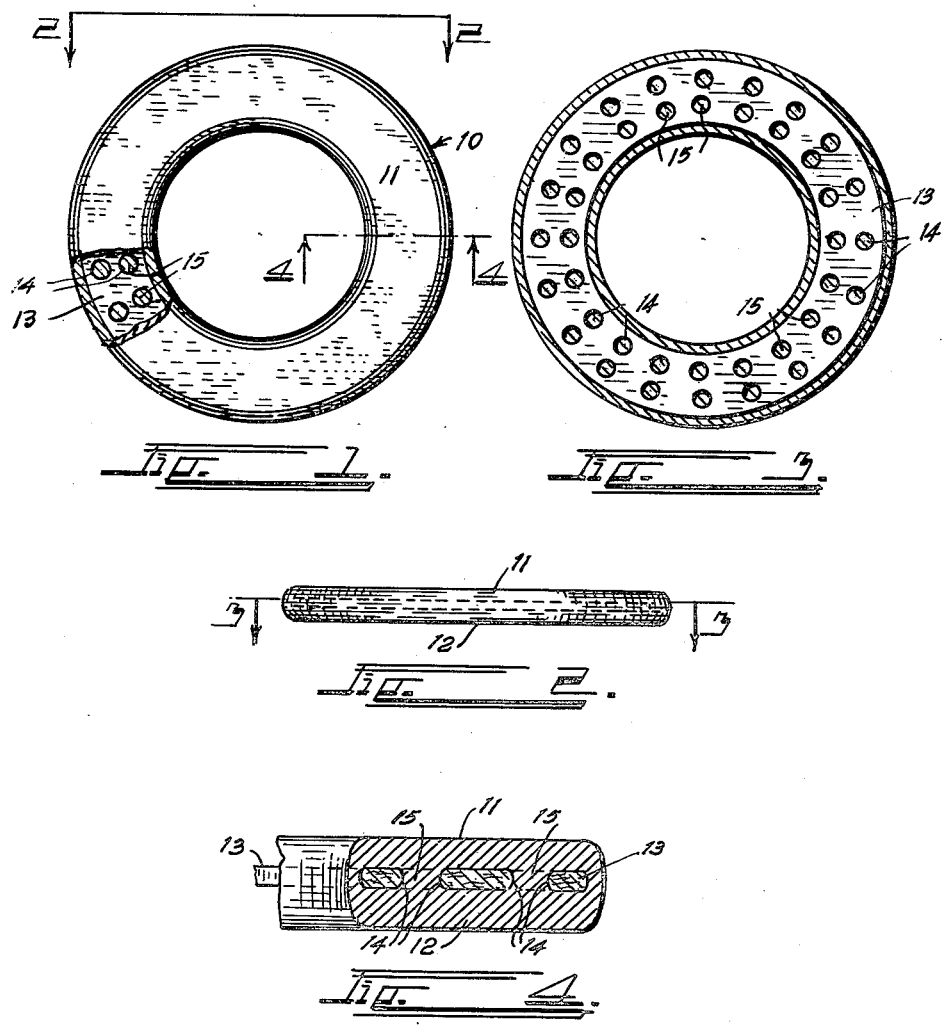
INVENTOR.
CONRAD GENJACK
BY
Anderson & Mueller
ATTORNEYS.

Patented July 22, 1952

2,604,404

UNITED STATES PATENT OFFICE 2,604,404

BABY SAFETY AND TEETHING BISCUIT

Conrad Genjack, North Vancouver, British Columbia, Canada

Application September 1, 1949, Serial No. 113,578

2 Claims. (Cl. 99—86)

1

This invention relates to improvements in baby safety and teething biscuit, of the type described in my abandoned application, Serial No. 787,321, filed November 21, 1947.

Babies, as is well known, are fond of sweet foods such for example as cookies. When babies are given brittle cookies to eat it frequently happens that they will break off a piece too large to swallow which then lodges in their throat causing great suffering and at times having fatal consequences. The danger pointed out above is also present when babies are given brittle candy from which they may break pieces too large to swallow.

It is the object of this invention to produce a biscuit, cooky or candy which shall be so formed that babies will be unable to break off pieces of dangerously large size while at the same time not interfering with their enjoyment thereof.

Another object of this invention is to produce a sweet in the form of a biscuit, cake or cooky that in addition to the safety feature pointed out above, will also serve as an aid to teething.

The above and any other objects that may become apparent as the description proceeds are obtained by means of a construction and arrangement of parts that will now be described in detail for which purpose reference will be had to the accompanying drawing in which the invention has been illustrated and in which Figure 1 is a plan view of a cake or candy of annular shape which embodies my invention, a portion thereof being broken away to better disclose the construction;

Figure 2 is an edge view looking through plane 2—2, Figure 1;

Figure 3 is a section taken on line 3—3, Figures 2 and 4; and

Figure 4 is a section taken on line 4—4, Figure 1, the section being to an enlarged scale.

In the drawing reference numeral 10 designates the invention as a whole. It is pointed out at this time that the biscuit, cooky or candy, need not be of annular shape but may be a round disk like an ordinary cooky whose sides have been designated by numerals 11 and 12; it may even be in the shape of a round ball.

The invention illustrated consists of a ring 13 of tough compressed rice paper or other suitable material, which must be approved for such use by the proper public officials. In the embodiment illustrated ring 13 is provided with a number of holes, 14, somewhat as shown in Figure 3. The ring is covered on both sides with biscuit or cooky dough or sugar candy material and the layers are subjected to sufficient pressure to cause the material to project through holes 14 forming plugs 15 that serve to hold the dough or candy material in position, this is necessary more particularly where the dough or other material does not adhere strongly to

2 the material of the ring. As pointed out above, the nonedible center does not have to be annular but may comprise a round disk, in which case the diameter may be somewhat smaller, the annular construction is believed to be preferable. When a baby is given a biscuit, cooky or candy constructed as above described, it may bite into the material without danger of breaking off any large piece. Since the shape is ring like it may be made large in diameter and of a width that makes it suitable for the baby to use it as a teething ring.

The dough may be of any suitable kind and may be candy material, if desired.

The central disk or core, being made from a tough nonsoluble material, serves admirably as an aid to teething and therefore performs a double function (1) it serves to hold the edible material from breaking and limits the size of any part removed and (2) it serves as an aid to teething.

From the above it will be apparent by incorporating in a biscuit, cooky or candy a tough yieldable core of sterile material of such nature that it will not disintegrate when softened by saliva an edible article is produced which makes it practically impossible for a baby to break off pieces of sufficient size to cause injury.

What I claim as new is:

1. A baby safety and teething biscuit consisting of a thin layer of rice paper of extended area completely enclosed in edible material, said layer adapted to reinforce the material and prevent breaking off of large pieces thereof.

2. A baby safety and teething biscuit of disk shape consisting of a flat disk of rice paper of annular shape, provided with a plurality of perforations, and a covering of edible material for the sides and edges of the disk extending through the perforations and completely enclosing the disk, the rice paper serving to prevent a child from taking dangerously large bites and, in addition, functions as an aid to teething.

CONRAD GENJACK.

REFERENCES CITED

The following references are of record in the file of this patent:

UNITED STATES PATENTS

| Number | Name | Date |
|---|---|---|
| 1,929,906 | Skokowski | Oct. 10, 1933 |
| 2,092,160 | Hawerlander | Sept. 7, 1937 |
| 2,394,322 | McKee | Feb. 5, 1946 |
| 2,435,047 | McKee | Jan. 27, 1948 |
| 2,539,395 | Banks | Jan. 30, 1951 |

OTHER REFERENCES

Lederle, Educator Crackers, Johnson Educator Food Co., 215 Tremont St., Boston, page 11.